(12) United States Patent
Piniecki

(10) Patent No.: US 8,038,791 B2
(45) Date of Patent: Oct. 18, 2011

(54) CLINKER, SYSTEM AND METHOD FOR MANUFACTURING THE SAME

(75) Inventor: Ronald Robert Piniecki, Slidell, LA (US)

(73) Assignee: Edw. C. Levy Co., Detroit, MI (US)

( * ) Notice: Subject to any disclaimer, the term of this patent is extended or adjusted under 35 U.S.C. 154(b) by 1024 days.

(21) Appl. No.: 11/767,614

(22) Filed: Jun. 25, 2007

(65) Prior Publication Data

US 2008/0053339 A1 Mar. 6, 2008

Related U.S. Application Data

(60) Provisional application No. 60/824,129, filed on Aug. 31, 2006.

(51) Int. Cl.
*C04B 7/36* (2006.01)
(52) U.S. Cl. .......... 106/739; 106/745; 106/789; 432/14
(58) Field of Classification Search .................. 106/739, 106/745, 789; 432/14
See application file for complete search history.

(56) References Cited

U.S. PATENT DOCUMENTS

| | | | |
|---|---|---|---|
| 2,600,515 A | 6/1952 | Moosen | |
| 4,124,404 A * | 11/1978 | Suzuki et al. | 106/765 |
| 4,174,961 A | 11/1979 | Wolfs et al. | |
| 4,342,598 A * | 8/1982 | Kogan | 106/757 |
| 5,421,880 A * | 6/1995 | Young | 106/756 |
| 5,494,515 A * | 2/1996 | Young | 106/756 |
| 5,516,357 A * | 5/1996 | Edlinger et al. | 75/434 |
| 5,944,870 A * | 8/1999 | Edlinger | 75/434 |
| 5,976,243 A | 11/1999 | Oates et al. | |
| 6,109,913 A | 8/2000 | Young | |
| 6,391,105 B1 * | 5/2002 | Oates et al. | 106/705 |
| 6,491,751 B1 * | 12/2002 | Watson | 106/756 |
| 6,740,157 B2 * | 5/2004 | Piniecki | 106/739 |
| 7,037,368 B2 * | 5/2006 | Hoffis | 106/697 |
| 2003/0205175 A1 * | 11/2003 | Wiedenhoft et al. | 106/739 |
| 2004/0157181 A1 * | 8/2004 | Arnold et al. | 432/58 |
| 2007/0006778 A1 * | 1/2007 | Kehrmann | 106/697 |

FOREIGN PATENT DOCUMENTS

| | | |
|---|---|---|
| GB | 1556833 | 11/1979 |
| KR | 2005051768 | * 6/2005 |
| SU | 587119 | 1/1978 |

OTHER PUBLICATIONS

KR 2005051768 (Jun. 2, 2005) Chu et al., abstract only.*
KR 2005051768 A (Jun. 2005) Machine Translation into English.*
Office Action from Canadian Patent Office for application 2597842 dated Apr. 7, 2010.

* cited by examiner

*Primary Examiner* — Paul Marcantoni
(74) *Attorney, Agent, or Firm* — Honigman Miller Schwartz and Cohn LLP

(57) ABSTRACT

A cement product is disclosed. The cement product includes clinker defined by a feedstock material and a ladle metallurgical facility slag material derived from a ladle metallurgical facility steel production system. A system and method for manufacturing clinker is also disclosed.

7 Claims, 8 Drawing Sheets

CLINKER, SYSTEM AND METHOD FOR MANUFACTURING THE SAME

RELATED APPLICATION

This disclosure claims the benefit of Provisional Patent Application No. 60/824,129 filed on Aug. 31, 2006.

TECHNICAL FIELD

The invention relates in general to clinker and a system and method for manufacturing the same.

BACKGROUND

Cement and similar materials are made by providing one or more materials in a reduced size and then heating the one or more materials to define a product, which is commonly referred to in the art as 'clinker.' In the manufacture of clinker, the one or more materials may be heated in a rotary kiln to approximately 1400° C.-1450° C. by way of a flame within the rotary kiln that is fueled by a fuel source. The extreme temperature range of 1400° C.-1450° C. may be needed to meet the pyroprocessing level of the one or more materials to further refine/combine the one or more materials into a suitable clinker.

Recently, it has been estimated that about 2.5 billion tons of cement is made globally each year. As such, improvements are always sought in the manufacturing of clinker due to several monetary and environmental drawbacks that are inherent to the clinker manufacturing process. Some of the known drawbacks in the clinker manufacturing process may include the following: (1) the extreme temperatures needed to heat the one or more materials within the rotary kiln results in the need of a significant amount of fuel, (2) if, for example, the one or more materials in the clinker recipe include limestone ($CaCO_3$), the production of clinker may result in the contribution to greenhouse gases due to the de-carbonation of the limestone during the pyroprocessing of the limestone, and (3) the burning of a fossil fuel to provide the flame within the rotary kiln may also result in the contribution of greenhouse gases.

Accordingly, there is a need in the art for an improved clinker recipe as well as a system and method for manufacturing clinker that is both monetarily efficient and environmentally friendly.

BRIEF DESCRIPTION OF THE DRAWINGS

The disclosure will now be described, by way of example, with reference to the accompanying drawings, in which.

DETAILED DESCRIPTION

The Figures illustrate an exemplary embodiment of a system and method for manufacturing clinker that is both monetarily efficient and environmentally friendly in accordance with an embodiment of the invention. Based on the foregoing, it is to be generally understood that the nomenclature used herein is simply for convenience and the terms used to describe the invention should be given the broadest meaning by one of ordinary skill in the art.

Figure 1:
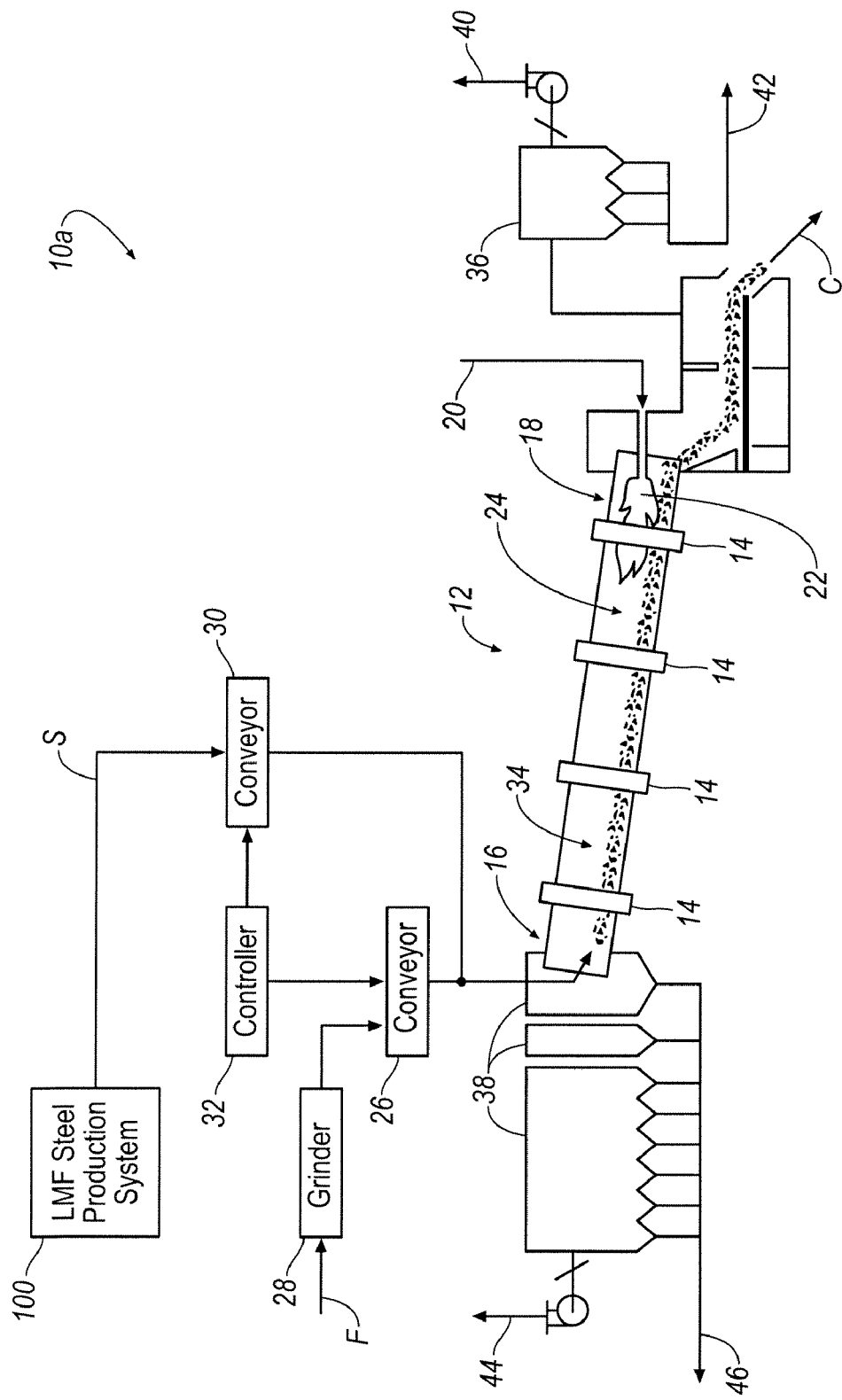
FIG. 1 illustrates a system for manufacturing clinker in accordance with an exemplary embodiment of the invention.

Referring to FIG. 1, a rotary kiln system for forming clinker, C, is shown generally at 10a according to an embodiment. The system 10a includes a rotary kiln 12 supported by flanges 14. The rotary kiln 12 includes a feed-end 16 and a heat-end or burning zone 18, which is tilted downwardly with respect to the feed-end 16. A fuel source 20 provides fuel that is burned to create a flame 22 within the heat-end 18 of the rotary kiln 12. According to an embodiment, the flame 22 heats an interior or sintering zone 24 of the rotary kiln 12 to a temperature of approximately 1500° C. Although the interior or sintering zone 24 of the rotary kiln 12 may be heated to approximately 1500° C., it will be appreciated that the interior or sintering zone 24 of the rotary kiln 12 may be heated to a reduced temperature that is less than 1500° C. depending on the one or more materials, F, S, that are introduced into the rotary kiln 12.

One or more raw materials, (i.e., feedstock) F, such as, for example, limestone, clay, sand and the like is/are carried by a variable speed conveyor belt 26 toward the feed end 16 of the rotary kiln 12. If, for example, a wet slurry is used, the feedstock, F, may be treated by a grinder 28 prior to being provided to the feed-end 16 of the rotary kiln 12.

Ladle metallurgical facility (LMF) slag, S, may also introduced at, for example, the feed end 16 by a conveying device 30, such as, for example, a variable speed conveyor belt. A controller 32 may control the speed of the conveyor belts 26, 30 so that the desired proportion of LMF slag, S, to feedstock, F, is provided at the feed end 16. Although the LMF slag, S, is shown being introduced at the feed end 16, it will be appreciated that the LMF slag, S, may be introduced at any desirable location of the rotary kiln 12 (see, e.g., FIG. 4) due to the fact that the LMF slag, S, is more friable when compared to non-LMF, steel slag, as described in greater detail below.

Once provided into the rotary kiln 12 at the feed end 16, the feedstock, F, and LMF slag, S, define a stream of clinker ingredients 34 that is directed through the rotary kiln 12 and toward the flame 22. Once heated and subsequently evacuated at the heat-end 18, the stream of clinker ingredients 34 defined by the feedstock, F, and LMF slag, S, exits the rotary kiln 12 as cement clinker, C, which may be further processed, as desired.

Pollution control devices 36, 38 are provided proximate the feed end 16 and heat-end 18, respectively, of the kiln 12. Waste gases 40 are expelled out of the pollution control device 36 to atmosphere. Also, reclaimed waste products 42 may be recovered from the pollution control device 36.

At the feed-end 16, the pollution control device 38 removes the waste gases 44 that are expelled to atmosphere. Also, reclaimed waste products at 46 may be recovered from the pollution control device 38.

As is known in the art, slag is a refuse produced from the melting of metals in a steel manufacturing process. Because it has long been recognized that many of the chemical compounds in slag are common to cement chemical compounds, and, because slag is available in large quantities and presents a major disposal problem, the inventors of the present invention have shown that LMF slag, S, may be utilized in the cement-making system 10a while having no deleterious effect on the operation of the rotary kiln 12.

As seen in FIG. 1, LMF slag, S, results from a steel production system/process 100 that includes a ladle refining station (not shown). The ladle refining station performs an "LMF step" that conducts most of the metallurgical refining to accomplish: an addition of alloys, heating, desulfurization, ultra low decarburization, degassing, as well as an inclusion, removal, or modification of materials, chemicals, and the like that results in an environmentally friendly slag, which is referred to as LMF slag, S.

The resulting LMF slag, S, of the steel production system 100 includes significantly different characteristics than that of non-LMF slag (i,e, "steel slag") produced from a conventional electrode arc furnace (EAF). LMF slag, S, for example, is high in aluminum (Al) and calcium (Ca), which includes a significant amount of free lime. LMF slag, S, also includes a very low iron (Fe) content that has a higher degree of friability than that of conventional EAF steel slag. Physically, LMF slag, S, may also be referred to as 'white slag' due to its color, which is directly related to its chemical composition.

For comparative purposes, Table 1 below shows the chemical composition (i.e., % by mass) of LMF slag, S, and EAF slag.

TABLE 1

|  | LMF Slag (% by mass) | EAF Slag (% by mass) |
| --- | --- | --- |
| Calcium Oxide (CaO) | 35-55% | 30-45% |
| Silicon Dioxide ($SiO_2$) | 5-15% | 13-18% |
| Magnesium Oxide (MgO) | 5-8% | 8-14% |
| Aluminum Oxide ($Al_2O_3$) | 20-40% | 1-3% |
| Ferric Oxide ($Fe_2O_3$) | 3-12% | 25-35% |
| Sodium Oxide ($Na_2O$) | 0-0.1% | 0-0.1% |
| Potassium Oxide ($K_2O$) | 0-0.1% | 0-0.1% |
| Magnesium Oxide (MnO) | 1-3% | 3-5% |

Physically, LMF slag, S, is easier to grind, and, as a result, is easier to reduce to minute particles (i.e., comminution); accordingly, the work index of LMF slag, S, is 20%-40% lower than conventional, high iron (Fe), non-LMF, steel slag. In addition, because the LMF slag, S, is decarbonated to ultra-low levels, less carbon is released to atmosphere, thereby decreasing the contribution to greenhouse gases in the atmosphere. Thus, in view of the above statements, and, by comparing the differences between LMF slag, S, and non-LMF, steel slag in Table 1 above, it can be surmised that LMF slag, S, is an optimal slag material that may be utilized in the system 10a for the manufacturing of clinker, C.

In addition to the environmental benefits of utilizing LMF slag, S, when manufacturing clinker, C, as described above, LMF slag, S, may also contribute to monetary savings related to the fuel source 20 that fuels the flame 22. When introduced into the rotary kiln 12, the decarbonated calcium (Ca) fraction of the LMF slag, S, eliminates approximately 420 kilo-calories/kilo-gram of energy that is utilized to heat a comparative stream of clinker ingredients that may include, for example, non-LMF, steel slag. Accordingly, the combination of the feedstock, F, and the decarbonated calcium (Ca) of LMF slag, S, forms clinker, C, including a crystalline exothermic form of calcium (Ca), silicon (Si), aluminum (Al), and iron (Fe).

The end result of using LMF slag, S, in combination with the feedstock, F, increases the amount of heat released during the heating process by way of the flame 22 such that a fuel savings of the fuel source 20 on the order of three-to-four-million Btu/Ton (i.e., 700 kilo-calories/kilo-gram) is realized. Thus, the consumption of the fuel source 20 is reduced, and, each ton of cement that is produced does not create additional carbon dioxide ($CO_2$) resulting from the de-carbonization of the LMF slag, S. In addition, as an increased amount of LMF slag, S, is introduced, an amount limestone ($CaCO_3$) feedstock, F, may be reduced to further reduce carbon dioxide ($CO_2$) emissions from an otherwise greater amount of limestone that would be included in the stream of clinker ingredients 34. Furthermore, the functional capacity of the rotary kiln 12 is increased as waste gas streams are reduced.

According to an embodiment, between approximately 1%-12% of the stream of clinker ingredients 34 is composed of LMF slag, S. It will be appreciated that as the percentage of LMF slag, S, is increased within the stream 34, the cost of the clinker, C, may be reduced due to the fact that LMF slag, S, is cheaper than virgin feedstock, F. In addition, because the LMF slag, S, has a higher friability, the consumption of the fuel source 20 is reduced due to the fact that the setting of the flame 20 may be reduced to a lower setting. Even further, because the fuel source 20 consumption is reduced, and, because the LMF slag, S, is decarbonized, the overall contribution to greenhouse gases in the clinker manufacturing process is reduced.

Figure 2:
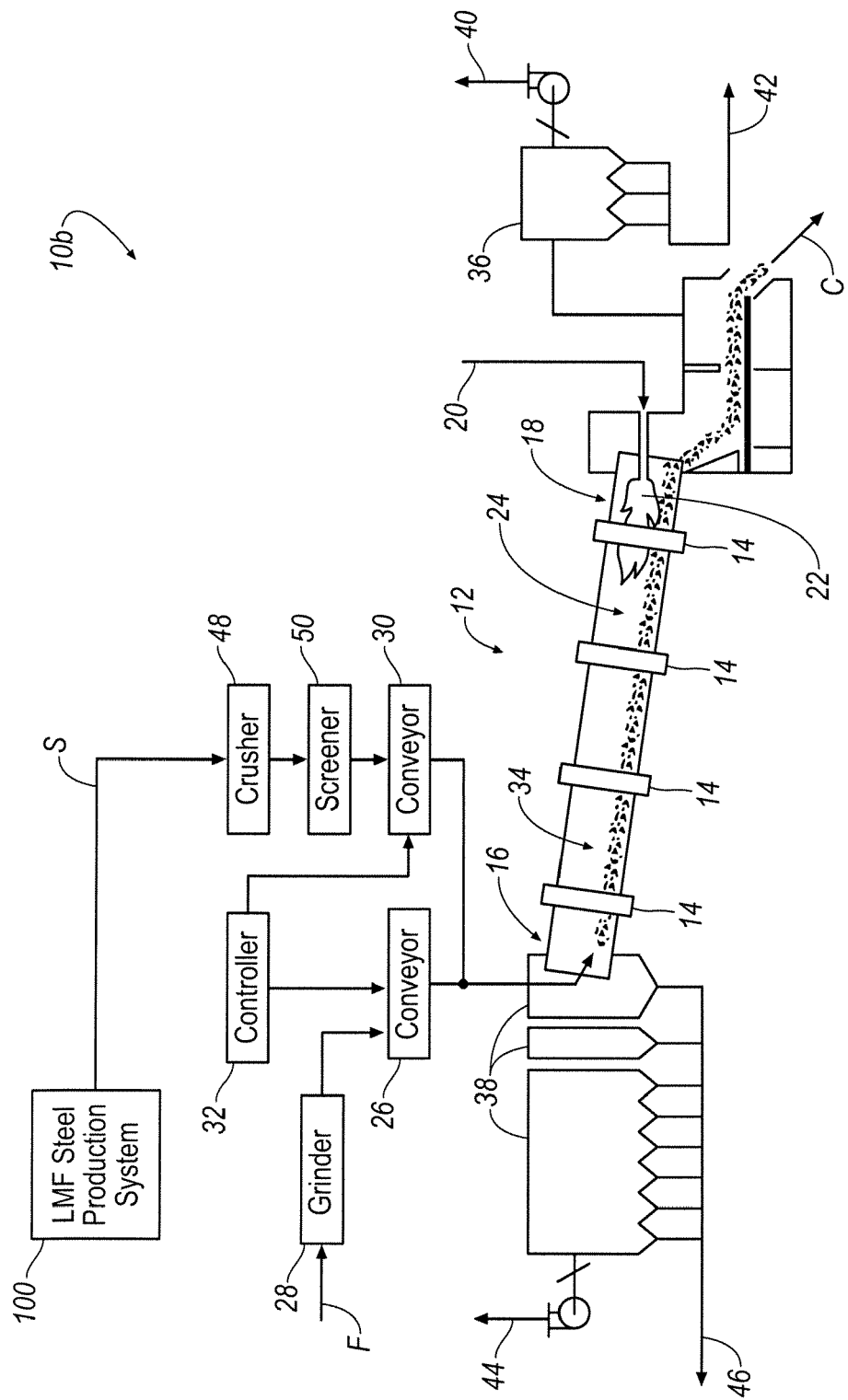
FIG. 2 illustrates a system for manufacturing clinker in accordance with an exemplary embodiment of the invention.

Referring to FIG. 2, a rotary kiln system for forming clinker, C, is shown generally at 10b according to an embodiment. The system 10b is substantially similar to the system 10a with the exception that the LMF slag, S, is crushed by a crusher 48 and subsequently screened by a screener 50 prior to introducing the LMF slag, S, at the feed end 16. The crusher 48 reduces the particle diameter of the LMF slag, S, to approximately a 1.5" or less diameter such that approximately 70% of the crushed LMF slag, S, passes through, for example, a 200-type mesh screener 50.

Figure 3:
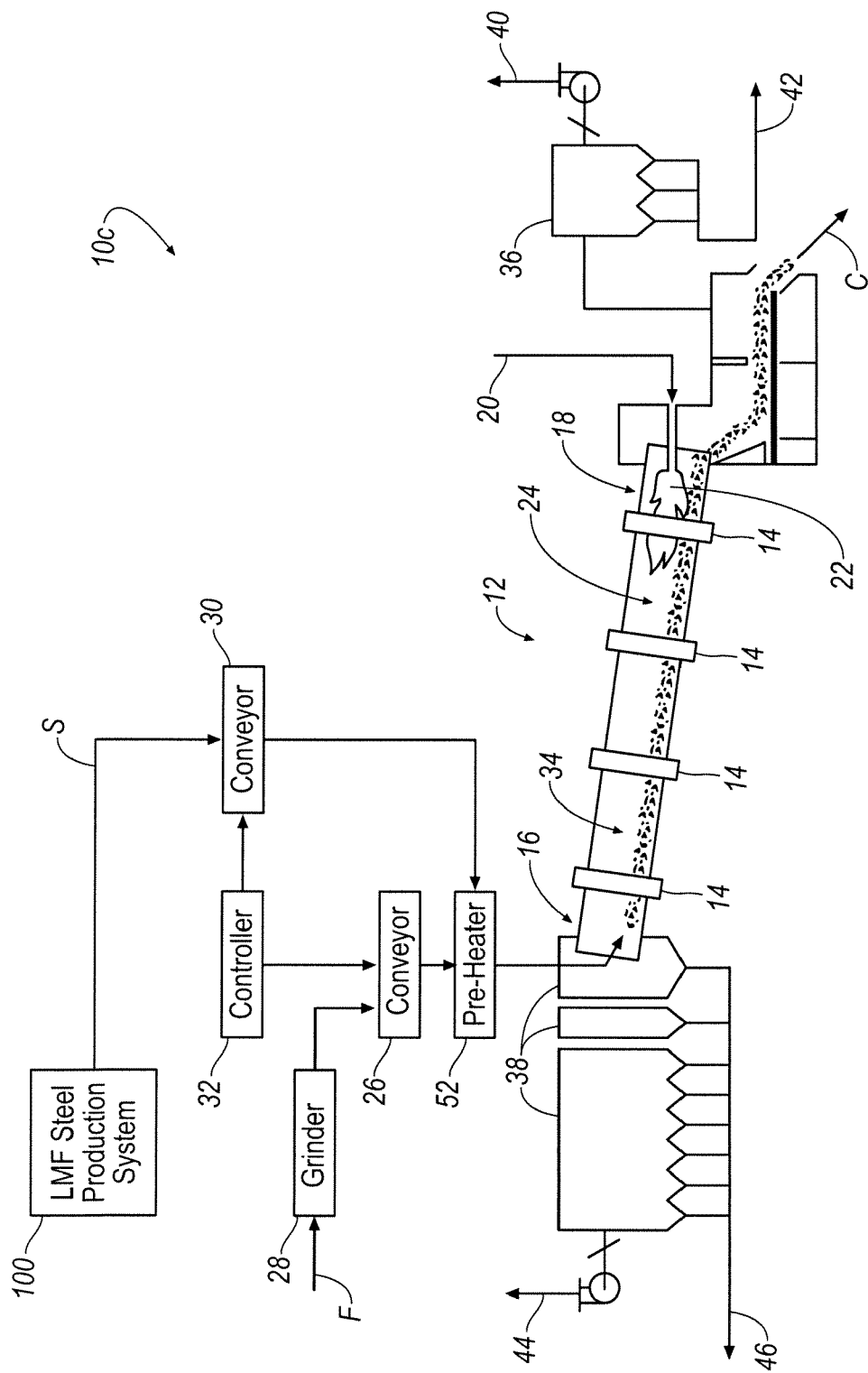
FIG. 3 illustrates a system for manufacturing clinker in accordance with an exemplary embodiment of the invention.

Referring to FIG. 3, a rotary kiln system for forming clinker, C, is shown generally at 10c according to an embodiment. The system 10c is substantially similar to the system 10a with the exception that the LMF slag, S, may be mixed and pre-heated with the feedstock, F, in a pre-heater 52 prior to introducing the LMF slag, S, and feedstock, F, at the feed end 16. It will also be appreciated that the LMF slag, S, may be introduced at the feed end 16 as larger diameter, coarse LMF slag, S (see, e.g., FIG. 1), or, alternatively, as a crushed and screened LMF slag, S (see, e.g., FIG. 2) prior to being pre-heated at 52.

Figure 4:
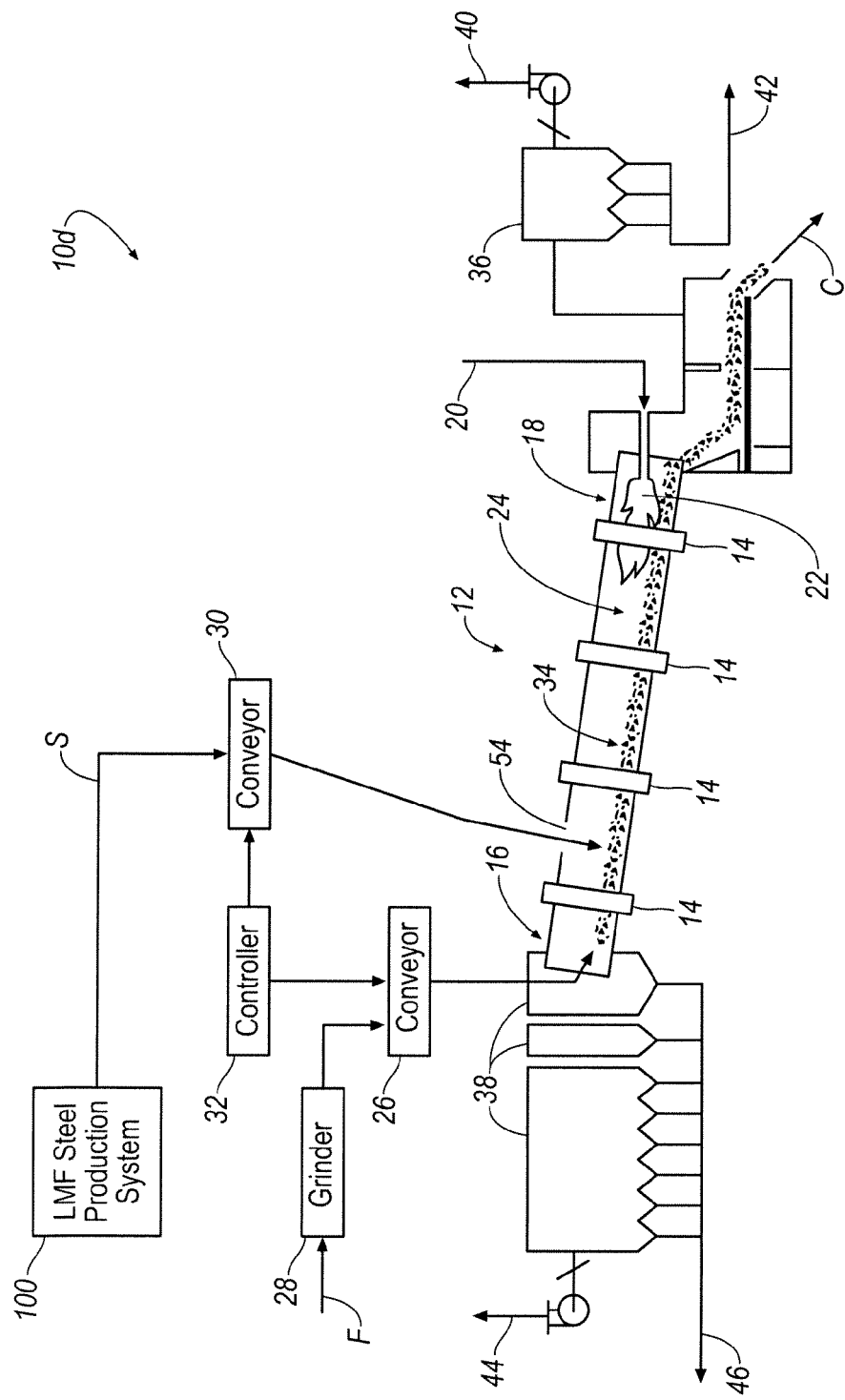
FIG. 4 illustrates a system for manufacturing clinker in accordance with an exemplary embodiment of the invention.

Referring to FIG. 4, a rotary kiln system for forming clinker, C, is shown generally at 10d according to an embodiment. The system 10d is substantially similar to the system 10a with the exception that the LMF slag, S, is not mixed with the feedstock, F, nor provided into the rotary kiln 12 at the feed end 16. As illustrated in FIG. 4, and, as described above, due to the higher degree of friability of the LMF slag, S, the LMF slag, S, is introduced into the rotary kiln 12 at an intermediate feed zone 54 between the feed end 16 and the heat-end 18, but before the flame 22. It will be appreciated that the LMF slag, S, may be introduced at the intermediate feed zone 54 as larger diameter, coarse LMF slag, S (see, e.g., FIG. 1), or alternatively, as a crushed and screened LMF slag, S (see, e.g., FIG. 2). Even further, it will be appreciated that the LMF slag, S, may be a pre-heated by a pre-heater (see, e.g., the pre-heater 52 of FIG. 3) such that the LMF slag, S, is pre-heated but not pre-mixed with feedstock, F.

Figure 5:
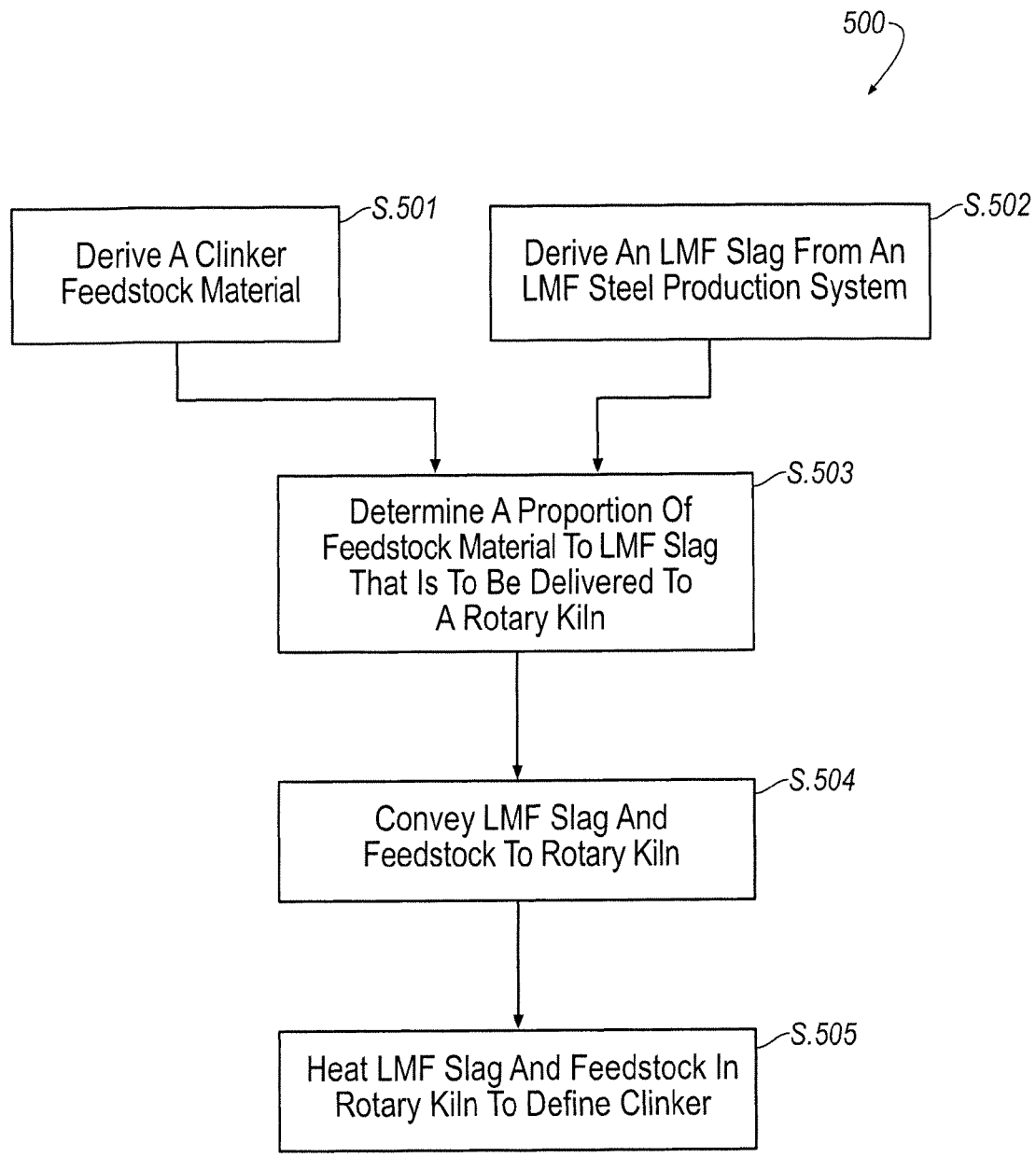
FIG. 5 illustrates a method for manufacturing clinker in accordance with an exemplary embodiment of the invention.

Referring to FIG. 5, a method 500 for manufacturing clinker, C, is shown generally at steps S.501-S.505. The method 500 relates to the system 10a shown in FIG. 1. At step S.501, a clinker feedstock material, F, is derived, and, at step S.502, an LMF slag, S, is derived from a steel production system 100. At step S.503, an operator determines a proportion of clinker feedstock material, F, to LMF slag, S, that will compose the ingredients of the recipe for the clinker, C. Step S.503 may include, for example, a programming or setting of a speed for a conveyor 26 that delivers the clinker feedstock material, F, to a rotary kiln 12 and a speed for a conveyor 30 that deliver LMF slag, S, to the rotary conveyor 12.

According to an embodiment, for example, each conveyor 26, 30 is loaded with a substantially similar volume of material, F, S. Then, the conveyor 30 may be set at a speed 1/10 of that of the conveyor 26. If programmed as described above, step, S.504, may include, for example, a conveyance or delivery of approximately 1/10 the amount of LMF slag, S, to the rotary kiln 12 than that of the clinker feedstock material, F. Once delivered to the rotary kiln 12, the clinker feedstock material, F, and LMF slag, S, is heated by the flame 22 to define clinker, C.

Figure 6:
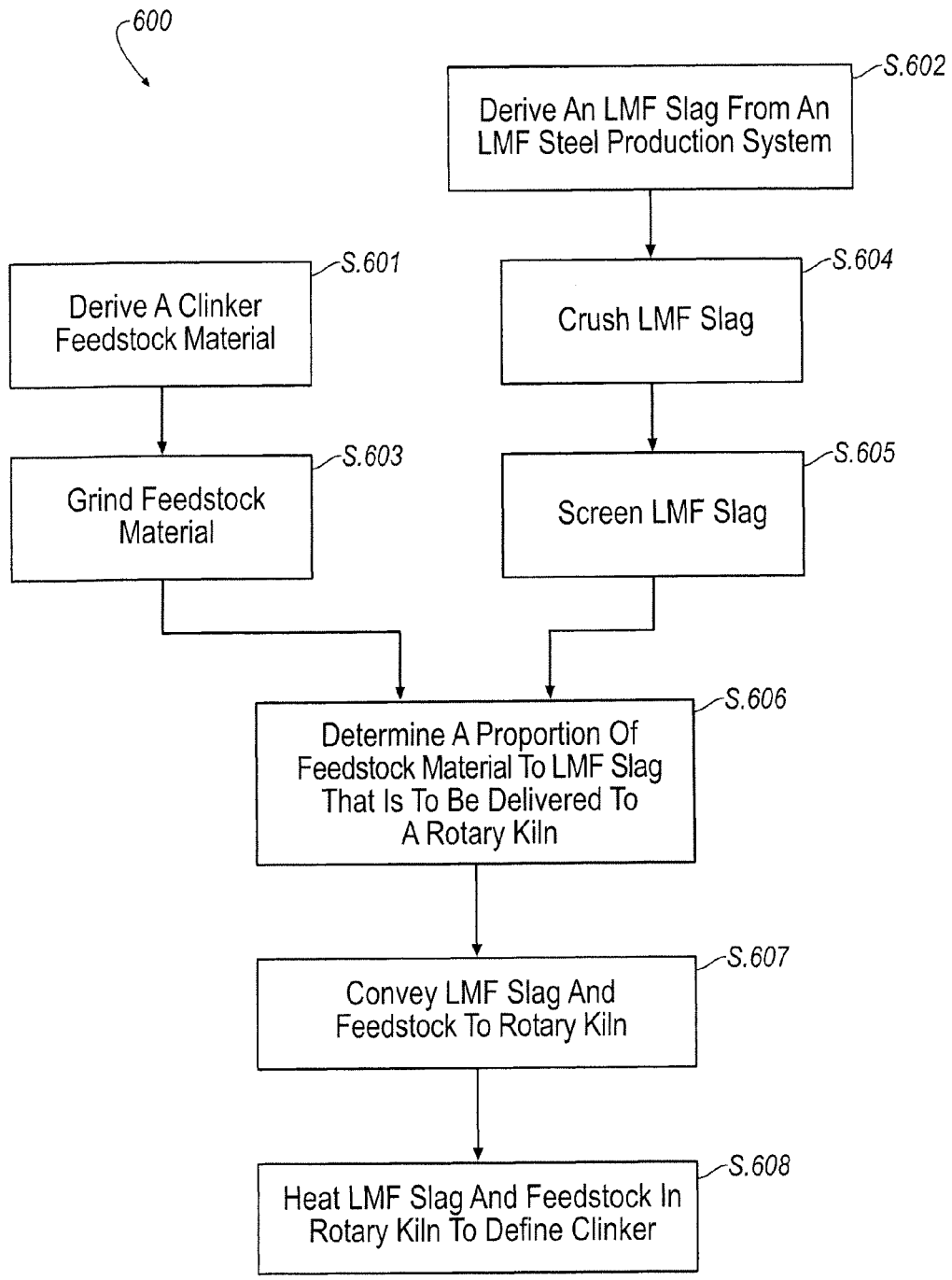
FIG. 6 illustrates a method for manufacturing clinker in accordance with an exemplary embodiment of the invention.

Referring to FIG. 6, a method 600 for manufacturing clinker, C, is shown generally at steps S.601-S.608. The method 600 relates to the system 10b shown in FIG. 2. In general, the method 600 is substantially similar to the method 500 with the exception of a pre-treatment of the materials, S, F, at steps S.603-S.605 prior to introduction into the rotary kiln 12. At step, S.603, the clinker feedstock material, F, may be ground, crushed, or otherwise reduced to smaller particles. At step, S.604, the LMF slag, S, may be similarly ground, crushed, or otherwise reduced to smaller particles. Subsequently, at step, S.605, the LMF slag, S, may be screened to filter the reduced particles from larger particles that are not desired to be included in the recipe of the clinker, C.

Figure 7:
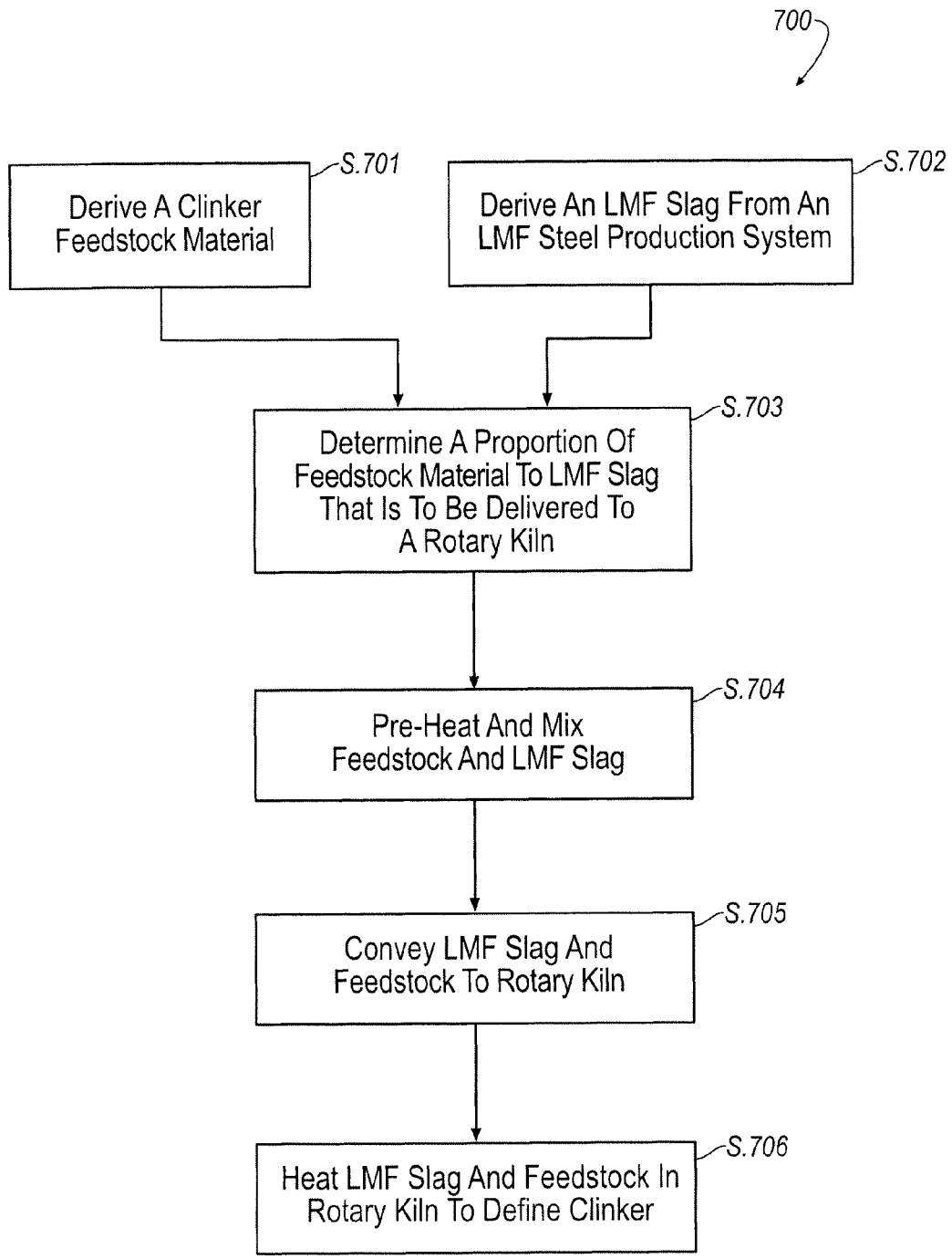
FIG. 7 illustrates a method for manufacturing clinker in accordance with an exemplary embodiment of the invention.

Referring to FIG. 7, a method 700 for manufacturing clinker, C, is shown generally at steps S.701-S.706. The method 700 relates to the system 10c shown in FIG. 3. In general, the method 700 is substantially similar to the method 500 with the exception of a pre-treatment of the materials, S, F, at step, S.704, prior to introduction into the rotary kiln 12. At step, S.704, the clinker feedstock material, F, and LMF slag, S, may be pre-heated prior to being super-heated to a higher, extreme temperature within the rotary kiln 12.

Figure 8:
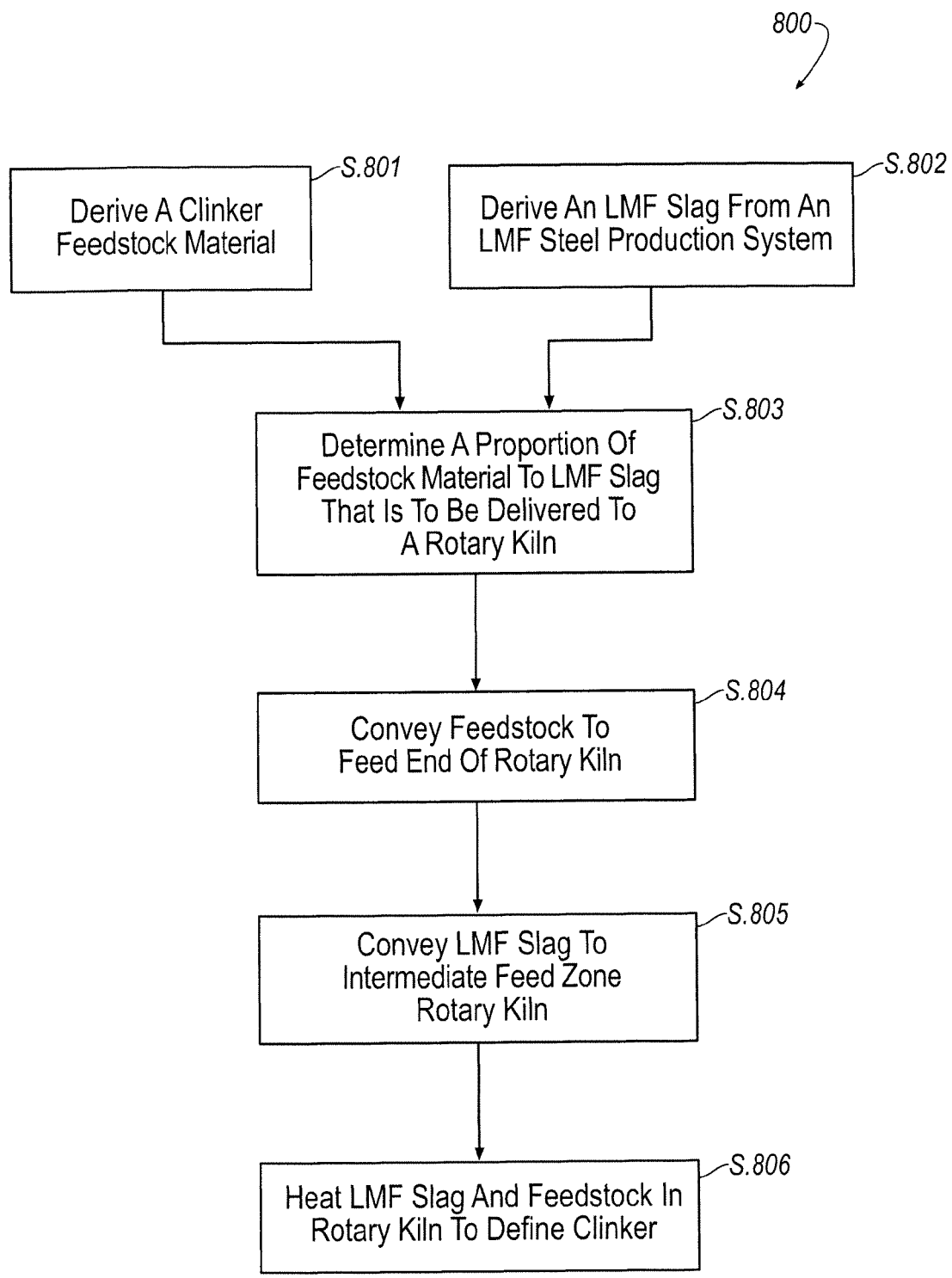
FIG. 8 illustrates a method for manufacturing clinker in accordance with an exemplary embodiment of the invention.

Referring to FIG. 8, a method 800 for manufacturing clinker, C, is shown generally at steps S.801-S.806. The method 800 relates to the system 10d shown in FIG. 1. The method 800 is substantially similar to the method 500 with the exception of how the materials, S, F, are delivered to the rotary kiln 12. At step, S.804, for example, the feedstock material, F, is delivered to the feed end 16 of the rotary kiln 12. At step, S.805, the LMF slag, S, may be delivered at a feed location after the feed end 16 of the rotary kiln 12, such as, for example, an intermediate feed zone 54.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method for manufacturing a cement product, comprising the steps of:
    providing a system for forming clinker, wherein the system consists of:
        a controller,
        a first variable-speed conveyor belt and a second variable-speed conveyor belt, wherein the controller is communicatively-coupled to each of the first and second variable-speed conveyor belts for controlling the speed of each of the first and second variable-speed conveyor belts,
        a rotary kiln including a feed-end and a heat-end, wherein the first and second variable-speed conveyor belts are in communication with the feed-end of the rotary kiln, and
        a fuel source in communication with the heat-end, wherein the fuel source provides fuel that is burned for creating a flame within the rotary kiln, wherein the flame is utilized for heating a portion of an interior of the rotary kiln, wherein the portion of the interior of the rotary kiln that is heated by the flame results in the portion of the interior of the rotary kiln forming a sintering zone;
    deriving clinker ingredients including a first material comprising a clinker feedstock material, and a second material consisting of a ladle metallurgical facility slag produced by a ladle metallurgical facility steel production system;
    delivering a proportion of the clinker feedstock material to the ladle metallurgical facility slag to the feed-end of the rotary kiln by: conveying, with the first variable-speed conveyor belt, the clinker feedstock material to the feed-end of the rotary kiln at a first conveying speed and conveying, with the second variable-speed conveyor belt, the ladle metallurgical facility slag to the feed-end of the rotary kiln at a second conveying speed, wherein the second conveying speed is less than the first conveying speed, wherein the clinker feedstock material and the ladle metallurgical facility slag forms a stream of clinker ingredients; and
    directing the stream of clinker ingredients from the feed-end, through the rotary kiln, past the flame and out of the heat-end, and, as the stream of clinker ingredients is directed past the flame, the flame is utilized for heating the stream of clinker ingredients.

2. The method according to claim 1, wherein after the deriving a ladle metallurgical facility slag step, further comprising the steps of:
    crushing the ladle metallurgical facility slag; and
    screening the ladle metallurgical facility slag.

3. The method according to claim 1, wherein after deriving the clinker feedstock material step, further comprising the step of:
    grinding the clinker feedstock material.

4. The method according to claim 1, wherein prior to the delivering step, further comprising the step of:
    pre-heating one or more of the clinker feedstock material and ladle metallurgical facility slag.

5. The method according to claim 1, wherein the second conveying speed is less than the first conveying speed such that the delivered proportion of the clinker feedstock material to the ladle metallurgical facility slag results in the ladle metallurgical facility slag composing approximately 1% to 12% of the stream of clinker ingredients.

6. The method according to claim 1, wherein the feedstock material includes one or more of a combination selected from a group consisting of
    limestone,
    clay, and
    sand.

7. The method according to claim 1, wherein the second conveying speed is approximately 1/10 of that of the first conveying speed.

* * * * *